(12) United States Patent
Shuster

(10) Patent No.: US 9,137,257 B2
(45) Date of Patent: Sep. 15, 2015

(54) ANTI-PHISHING FILTER

(75) Inventor: Gary Stephen Shuster, Fresno, CA (US)

(73) Assignee: Gary Stephen Shuster, Fresno, CA (US)

( * ) Notice: Subject to any disclaimer, the term of this patent is extended or adjusted under 35 U.S.C. 154(b) by 980 days.

(21) Appl. No.: 11/744,362

(22) Filed: May 4, 2007

(65) Prior Publication Data

US 2008/0276315 A1     Nov. 6, 2008

(51) Int. Cl.
| | | |
|---|---|---|
| *H04L 29/00* | (2006.01) | |
| *H04L 29/06* | (2006.01) | |
| *H04L 12/58* | (2006.01) | |
| *G06F 21/62* | (2013.01) | |

(52) U.S. Cl.
CPC ........ *H04L 63/1408* (2013.01); *G06F 21/6245* (2013.01); *H04L 12/581* (2013.01); *H04L 12/585* (2013.01); *H04L 51/04* (2013.01); *H04L 51/12* (2013.01); *H04L 63/1425* (2013.01); *H04L 63/1483* (2013.01); *H04L 63/101* (2013.01)

(58) Field of Classification Search
CPC ......... H04L 12/18; H04L 12/22; H04L 12/58; H04L 41/02; H04L 41/50; H04L 29/06; H04L 63/10
USPC ......... 726/22–24, 11–14, 1–4, 16–17, 36–30; 709/230–232, 201–207
See application file for complete search history.

(56) References Cited

U.S. PATENT DOCUMENTS

| | | | |
|---|---|---|---|
| 7,752,251 B1* | 7/2010 | Shuster et al. | 709/200 |
| 2002/0198940 A1* | 12/2002 | Bower et al. | 709/204 |
| 2004/0019650 A1* | 1/2004 | Auvenshine | 709/206 |
| 2004/0078595 A1* | 4/2004 | Kent et al. | 713/201 |
| 2004/0111479 A1* | 6/2004 | Borden et al. | 709/206 |
| 2004/0117501 A1* | 6/2004 | Day et al. | 709/232 |
| 2004/0162904 A1* | 8/2004 | Eida et al. | 709/228 |
| 2006/0037076 A1* | 2/2006 | Roy | 726/22 |
| 2006/0123338 A1* | 6/2006 | McCaffrey et al. | 715/531 |
| 2006/0253784 A1* | 11/2006 | Bower et al. | 715/738 |
| 2007/0094394 A1* | 4/2007 | Singh et al. | 709/226 |
| 2008/0010377 A1* | 1/2008 | Nissennboim | 709/226 |
| 2008/0196098 A1* | 8/2008 | Cottrell et al. | 726/12 |

OTHER PUBLICATIONS

Stone, John, and Sarah Merrion. "Instant messaging or instant headache?." Queue 2.2 Apr. 2004: 72.*

* cited by examiner

*Primary Examiner* — Madhuri Herzog
(74) *Attorney, Agent, or Firm* — Coleman & Horowitt, LLP; Sherrie M. Flynn

(57) ABSTRACT

A method operates to detect personal identifying or account information exchanged in a real-time electronic communication occurring between computer network users, such as electronic chat. A detected personal identifier may be recognized as an attempt on the part of one user to engage in a phishing attack upon another user or to otherwise steal the other user's sensitive personal information. Upon recognizing the communication as an unwarranted attempt to collect such information, the electronic communication may be monitored, and communication of the personal information may be prevented.

18 Claims, 6 Drawing Sheets

500

```
User 123 :  Hello. How are You ?
User abc :  Fine, thank You.
User 123 :  What is your Social
            Security Number?
User abc :  111-22-3333
```

```
User 123 :  Hello. How are You ?
User abc :  Fine, thank You.
User 123 :  What is your Social
            Security Number?
User abc :  222-44-5555
```

FIG. 6

ANTI-PHISHING FILTER

BACKGROUND OF THE INVENTION

1. Field of the Invention

The present invention relates to a systems and methods for electronic communications via computer networks, and more particularly to filtering of such communications.

2. Description of Related Art

"Phishing" is a form of identity theft and internet scam in which attackers try to trick internet users into divulging sensitive personal information. Phishing attacks are often accomplished by sending e-mails to users which purport to be from a legitimate business and requesting the user to provide personal data. Also, phishers may employ websites which impersonate a legitimate business's website. Again, the purpose of such a website is to induce a user to provide his sensitive, personal information. Once armed with the user's identifying information, phishers use the information to engage in fraudulent transactions utilizing the users' identity.

Numerous methods have been implemented to prevent such attacks including e-mail spam filters, spyware and virus detection software, and digitally signed e-mail communications. These methods and applications have been moderately effective in preventing phishing attacks as they occur through e-mail communications.

Phishing attacks may also take place, with increasing regularity, within internet chat systems or "chat rooms." A chat system provides a means for computer users to anonymously meet and communicate about a particular subject of interest by immediately transmitting and sharing text and other data with each other through the chat system's computer network. Specifically, a chat system has a server, which is a host computer, and a plurality of terminal computers connected to the host. A message received by the host from a terminal user is immediately transmitted to another terminal user so that a chat is realized between the two users. In the chat system, the content of a user's communication is displayed on each user's terminal computer along with the name of the user who made the communication.

As with other phishing attacks described above, phishing attacks within chat rooms occur when one terminal user involved in the chat session tricks another terminal user to provide his confidential information. The thief then uses this confidential information to engage in fraudulent transactions. Users in a chat room may be vulnerable to phishing attacks because chat room users are anonymous, a chat room conversation often acquires an intimate nature wherein users relax their vigilance, and the chat room conversation occurs in real time, which may prevent some users from adequately reflecting upon a request for personal information.

It would therefore be desirable to provide is a system and method that can protect a chat room user while the user is engaging in electronic chat, especially in unsecured forums that are provided primarily for casual communications as a leisure activity.

SUMMARY

The invention provides a system and method whereby a communication within a chat system is monitored to recognize the input, by a chat room user, of certain keywords and/or patterns of data which typify personal, sensitive information. When the keyword or pattern is identified, the data exchanged in the chat is logged and the keyword or pattern is replaced with random data so that the user that requested the data and other users engaged in the chat receive and view only the random data and not the personal information requested.

In an embodiment of the invention, there is provided a chat room data exchange search and display method, comprising: determining keywords, phrases and data patterns for instructing a filter center to monitor the chat room data exchange; searching for the keyword, phrase or data patterns in a chat room message transmitted from a first terminal engaged in the chat room data exchange; recording all data transmitted from a first terminal for the remaining time the first terminal remains logged on to the chat room session when the keyword or phrase is detected; instructing the filter center to monitor responses from a second terminal displaying the transmitted data when the keyword, phrase or data pattern is detected; instructing the filter center to alter any data fitting the proscribed data pattern which is transmitted from the second terminal in response to the data transmitted from the first terminal when the keyword or phrase is detected; and displaying the altered data on the first terminal.

Therefore, when a user uses a pre-determined keyword or phrase, for example "birthdate" or "social security number," evidencing a request for personal identifying information, during a chat room session, the filter center may begin recording the chat room conversation and logging the users chat room registration data. Thereafter, the filter center may monitor any response to the user's request and alter any response that fits a corresponding data pattern (e.g., the data pattern associated with a social security number or birthdate) so as to display that altered response on the user's terminal.

In another embodiment of the invention, there is provided a chat room data exchange display method which comprises the steps of determining a data pattern for instructing a filter center to monitor a chat room data exchange; searching the data exchanged in a chat room session for the data pattern; altering the data comprising the data pattern; and displaying the altered data pattern on the terminals connected to the chat room session.

In this embodiment, any pre-determined data pattern, for example, the data pattern evidencing an individual's social security number i.e., n/n/n-n/n-n/n/n/n, can be searched for in real time during a chat room session. When detected, the data pattern may be randomly altered or scrambled and displayed to the other chat room terminals as different data. For example, the social security number entered by a user at one terminal as 111-22-3333 may be altered and displayed on the other terminals as, for example, 444-55-6666.

In another embodiment of the invention, there is provided a chat room data exchange display method which comprises the steps of; determining a data pattern for instructing a filter center to monitor the chat room data exchange; searching for the data pattern in a chat room message transmitted from a first terminal engaged in the chat room data exchange; instructing the filter center to block the chat room message transmitted from the first terminal; and to display on the first terminal a warning to the first terminal user that the exchange of such data may lead to theft of possible personal identifying information; and providing the first user with the option to transmit the data to the other users engaged in the chat session or to not send the data.

Therefore, when a user enters the predetermined data pattern evidencing personal identifying information, during a chat room session, the filter center may prevent the user's chat room data from being immediately transmitted to the other users engaged in the chat room session, and instead provides the user with a warning about disclosing personal identifying information. The user can thereafter heed the warning and refuse to provide the information, seek additional information regarding the other users' identity and purposes; or if the user determines that the information is innocuous, he or she can ignore the warning and continue with the chat room data exchange.

A more complete understanding of the invention will be afforded to those skilled in the art, as well as a realization of additional advantages and objects thereof by a consideration of the following detailed description of its embodiments. Reference will be made to the appended sheets of drawings which will first be described briefly.

BRIEF DESCRIPTION OF THE DRAWINGS

FIG. 5 is an exemplary diagram showing an example of a chat terminal monitor screen.

FIG. 6 is an exemplary diagram showing another example of a chat terminal monitor screen.

DETAILED DESCRIPTION OF EMBODIMENTS OF THE INVENTION

The disclosed solution to prevent and curtail phishing attacks and other attempts at identity theft in electronic chat room data exchanges is a system and method for monitoring chat room conversations and searching data exchanged for key words, phrases and/or patterns which evidence such attempts and preventing a chat room user from providing his or her personal identifying information. In the detailed description that follows, like element numerals are used to indicate like elements appearing in one or more of the figures.

Figure 1:
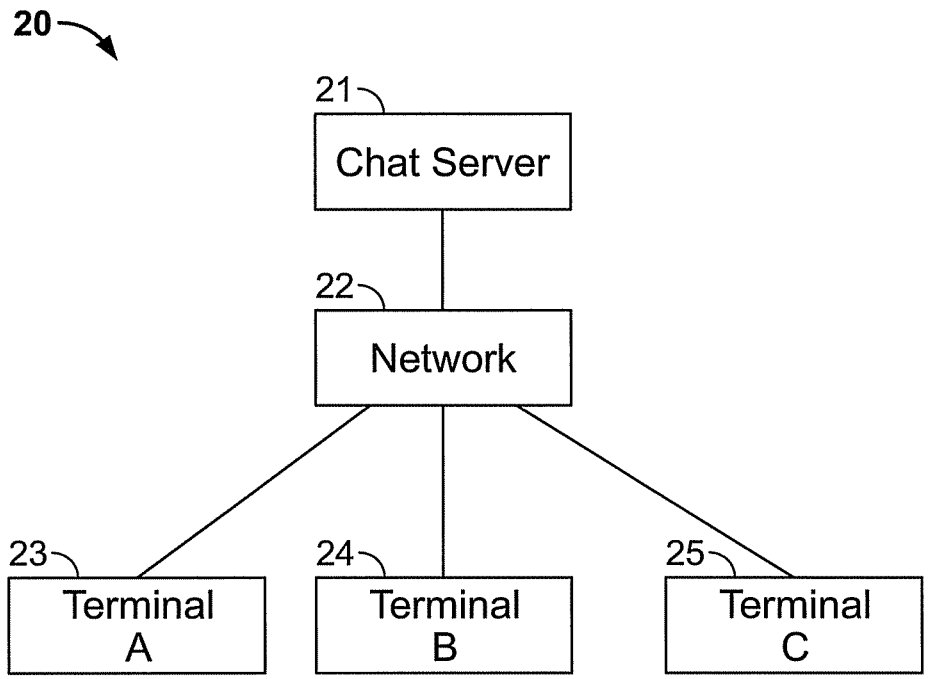
FIG. 1 is a block diagram showing a chat room network according to the invention.

FIG. 1 is a block diagram showing a chat room system 20 according to an embodiment of the present invention. System 20 may comprise a chat server 21, which is a computer, is connected to a network 22. Network 22 may comprise a wide area network, for example, the Internet. Terminals 23, 24, and 25, may comprise any user-operated communication device configured for connecting to network 22, for example, a personal or portable computer, mobile telephone or other handheld device, or dumb terminal. Although three terminals are illustrated, the number of terminals in a chat session may range from two to any number greater than two up to the processing limits of the chat room server. The terminals 23, 24, and 25 may be connected, through the network 22, to the chat server 21.

Figure 2:
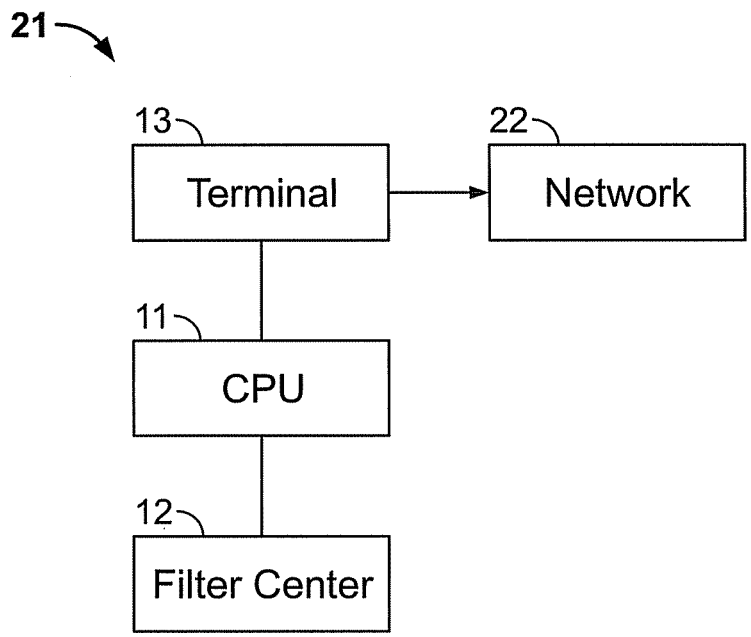
FIG. 2 is a block diagram showing a chat server according to the invention.

FIG. 2 is a block diagram showing exemplary details of chat server 21. The chat server may comprise a CPU 11 connected to a Filter Center 12 and a terminal 13. The Filter Center, described in more detail below, may comprise software or hardware configured for monitoring the chat room data exchange and searching the chat room data exchange for key words, phrases and/or data patterns. The terminal 13 may be used by an administrator to monitor and manage activity of the chat server and Filter Center.

Figure 3:
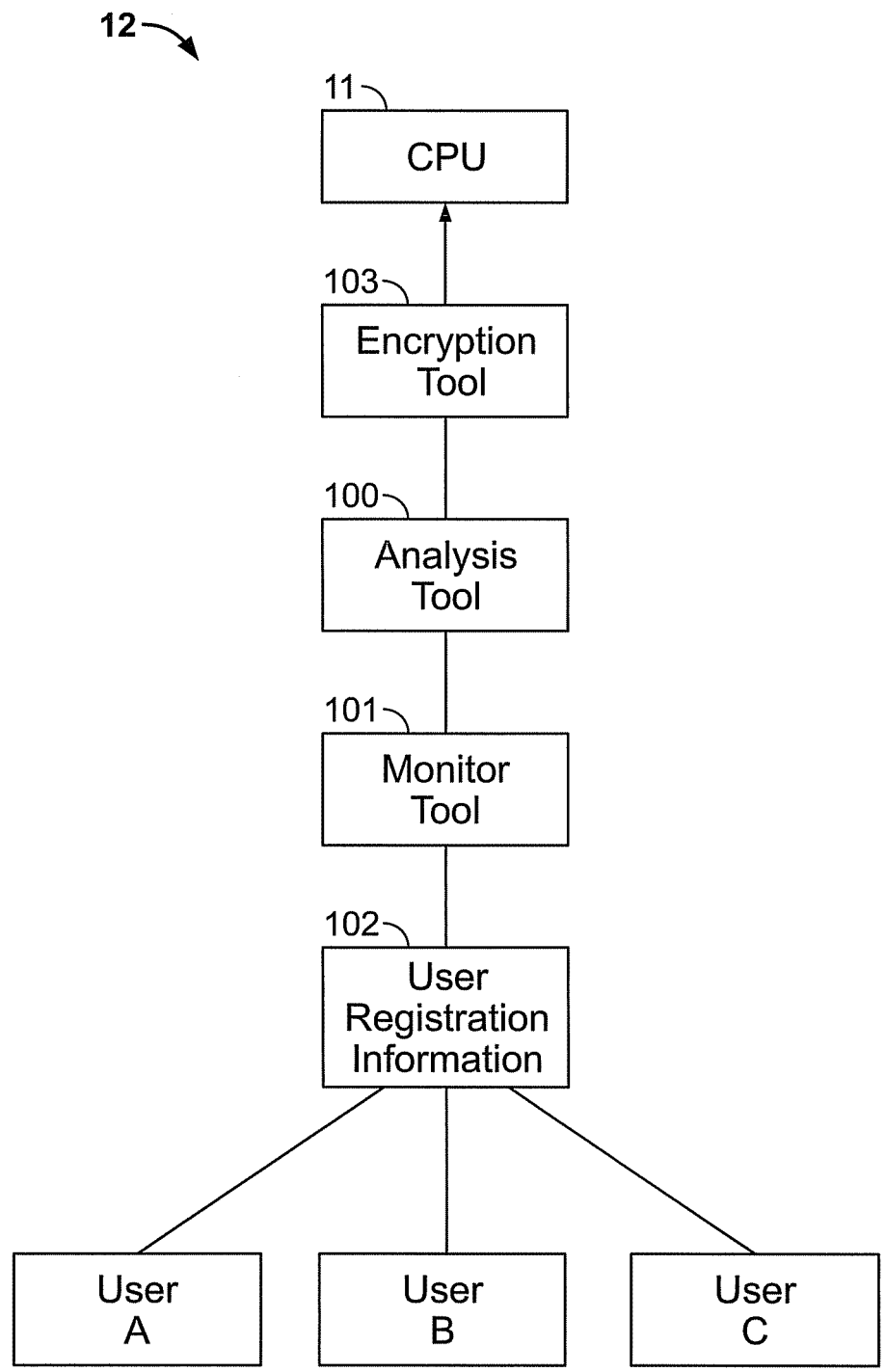
FIG. 3 is a block diagram showing aspects of a Filter Center system according to the invention.

FIG. 3 is a block diagram showing exemplary details of Filter Center 12. The Filter Center may comprise a Monitor Tool 101, User Registration Information Storage Tool 102, an Analysis Tool 100 and an Encryption Tool 103. When a user logs onto the chat room session, information about that user i.e., user name and other identifying information may be logged and stored by means of the Filter Centers Registration Information Storage Tool 102. The Analysis Tool 102 provides a means to search each chat entry received by the Chat Server 21 for keywords or phrases and other predetermined data patterns which may evidence personal identifying information vulnerable to identity thieves. If a keyword, phrase or data pattern is detected, the Monitor Tool 101 may initiate a recording or monitoring of the chat entries and the users' activity within in the chat room session in conjunction with the Registration Information Storage Tool 102. Thereafter, any chat entry that fits a predetermined data pattern, sent in response to a chat entry containing a keyword or phrase, may be routed to the Encryption Tool 103, which may randomly alter the chat entry. The chat entry may then be displayed on the other chat room users' terminals while the user who entered the data pattern may see his or her unaltered entry.

Figure 4:
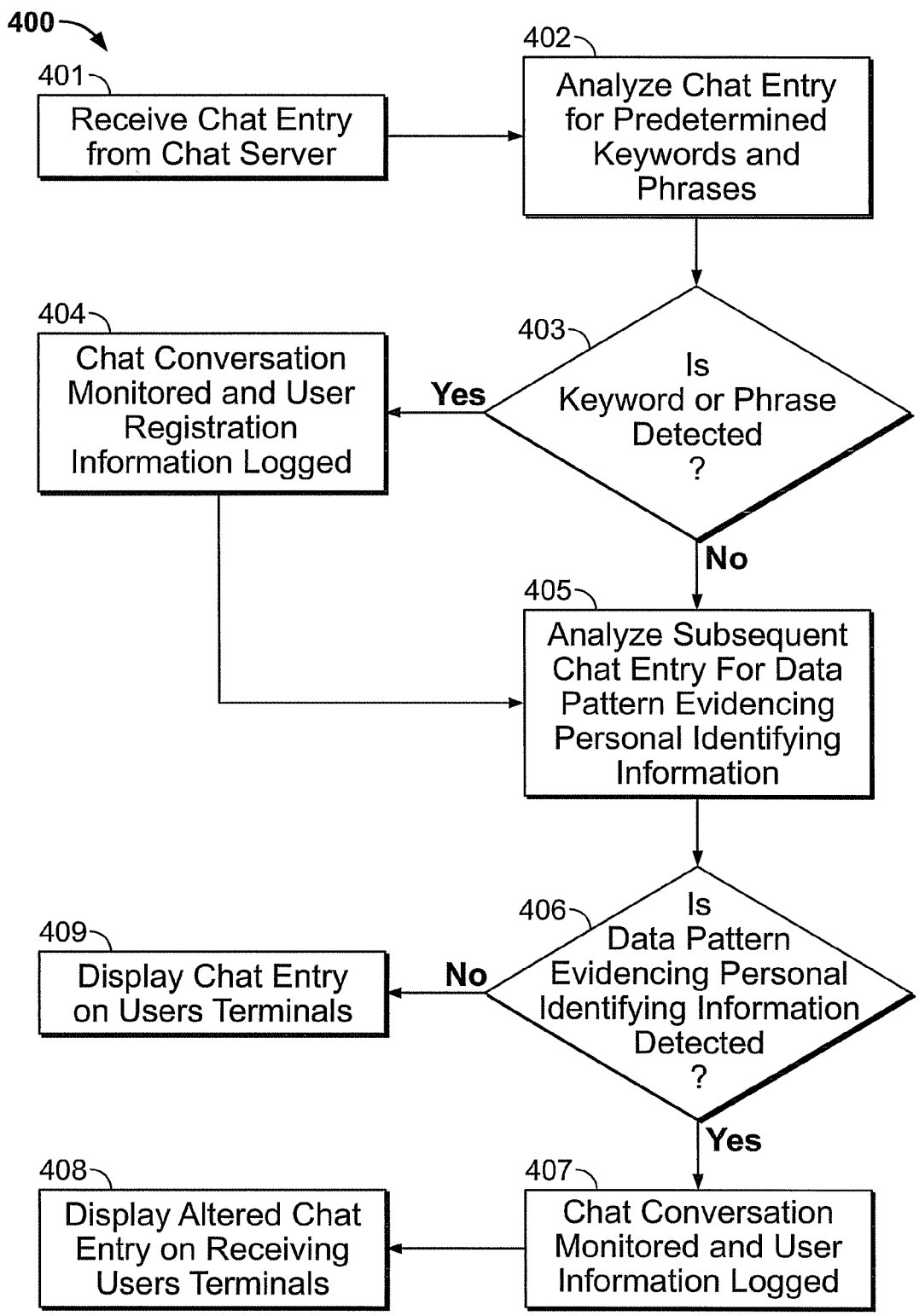
FIG. 4 is a flow diagram showing exemplary steps of a method of the invention according to a preferred embodiment of the invention.

FIG. 4 is a flow chart showing exemplary steps of a process 400 carried out by the Filter Center during the chat room session. A chat entry may be received by the Chat Server and routed to the Filter Center which receives the chat entry at S401. The contents of the chat entry may be parsed or searched by the Analysis Tool for a keyword or phrase at S402. If the keyword is detected as indicated at S403, a Monitor Tool may be initiated whereby the chat conversation is logged and recorded at S404. Also, the Monitor Tool may identify and log user registration information of the user whose chat entry contained the keyword or phrase, at S404. Thereafter, at S405, the Monitor Tool may identify the user, and any response by that user, to whom the chat entry which contained the keyword or phrase was directed. If the Monitor Tool recognizes the users' response as containing a pattern of data evidencing personal identifying information, the response may routed through the Encryption Tool 103 at S406. The Monitor Tool 101 may then monitor and log the users' registration information S407. The Encryption Tool may substitute the responding data with random data which is then displayed on the terminal 23, 24 and 25 of the other users involved in the chat session, at S408. If no data pattern designated for filtering is recognized, the original chat entry may displayed on the users' terminal at S409.

FIG. 5 and FIG. 6 are explanatory diagrams showing exemplary screenshots 500, 600 as may be displayed at two users' terminals according to an embodiment of the invention. Both displays 500, 600 show an exchange of text data in a "chat format," meaning the exchange of text data is presented in a unified display presenting each participating user's contribution to the chat session, and the identity of the user contributing each item of textual data.

As shown in FIG. 5, user "Naïve's" terminal monitor may include a display 500 providing Naive with a visual record of the data exchanged, in real time, between Naive and another user "Phisher." According to the example, Phisher has asked Naive for his social security number. The phrase "social security number" is a key phrase recognized by the Filter Centers Monitor Tool. As a result, the Filter Center may begin to monitor the chat room data exchange. In addition, when Naive inputs his social security number, his terminal display may show the social security number he entered, in this example, 111-22-3333. However, as shown in FIG. 6, Phisher's terminal may display a different social security number, in this example, 222-44-5555, reflecting the altering of Naïve's entry by the Encryption Tool which was activated by the key word, phrase, or designated data pattern.

The Filter Center may also consider variations of key words, for example, "SSN", "DOB", "Acct. No." or deliberate misspellings designed to evade the filtering process such as "what is your s03ial 3ecurity numb3r." Fuzzy logic, learning algorithms, manual updating, or any combination of the foregoing may be employed to keep abreast of and block communication patterns used by phishers to elicit personal information from identity theft victims.

In addition, or in the alternative, data patterns, for example social security numbers, dates, street addresses, phone numbers, bank account numbers, URL's, or any other type of data deemed to present an unacceptably high risk of identity theft, may be recognized by the Filter Center without the Filter Center having to search for and recognize a corresponding keyword or phrase. For example, the Filter Center may recognize the data pattern associated with a social security number, and automatically alter the display of the social security number on other users' terminals as shown in FIG. 6. As set forth above, other data patterns recognized by the Filter Center 12 may include, for example, birthdates, phone numbers, account numbers and alphanumeric passwords. In this embodiment, if a user attempts to evade the filter by using variations of key words that are outside the Filter Centers search parameters, or by not using keywords at all, the Filter Center may recognize the data pattern of any input that may constitute identifying information and alter the input so that a different entry would be displayed on the users' terminals. Since personal identifying information of the type sought by identity thieves fits only a limited number of patterns, the Filter Center 12 will be able to readily search for and recognize these patterns and prevent their disclosure.

Figure 7:
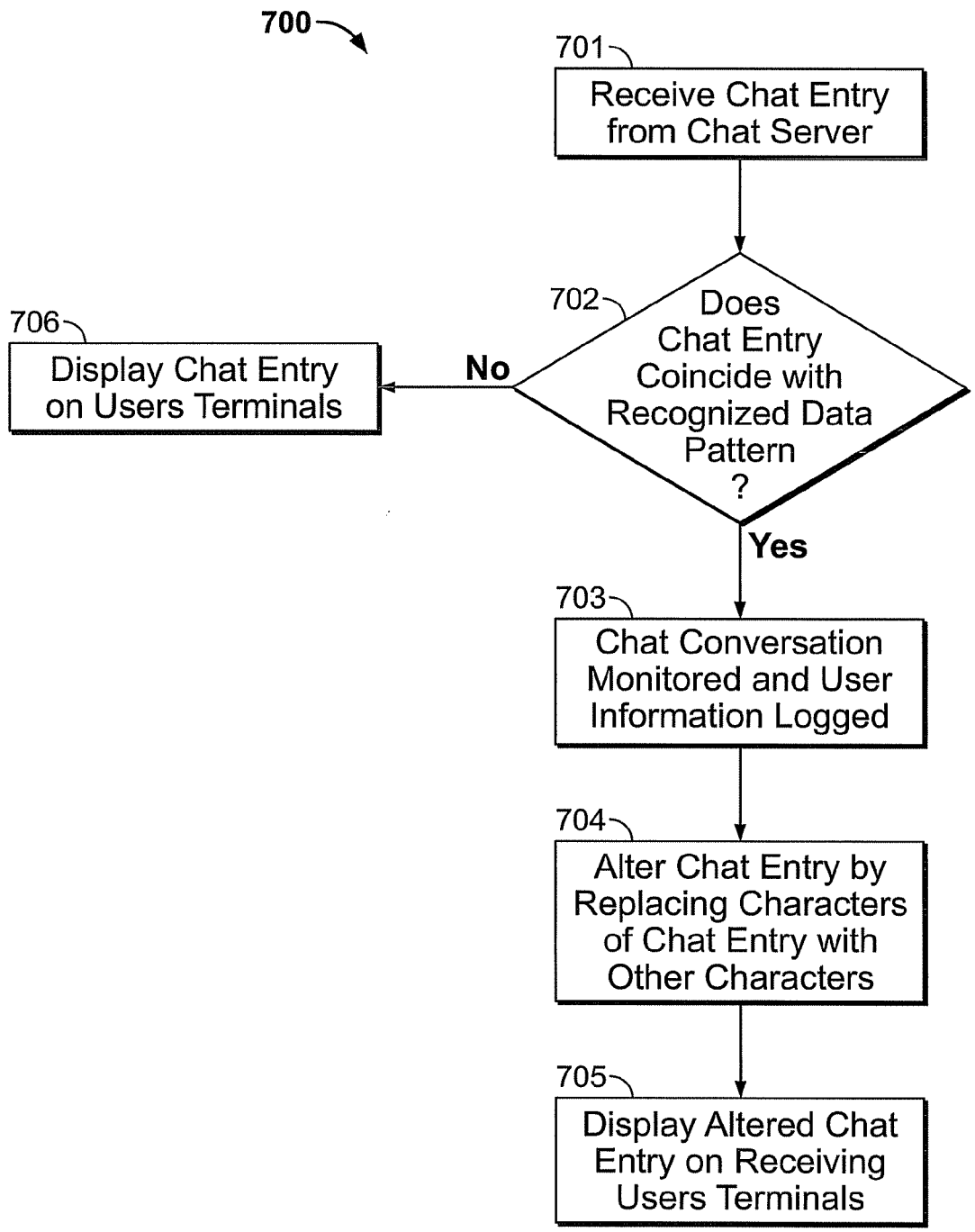
FIG. 7 is a block diagram showing exemplary steps of a method of the invention according to a second embodiment of the invention.

FIG. 7 show exemplary steps of a method 700 according to this second embodiment of the invention. Filter Center may receive a chat entry, at S701, from the Chat Server. The chat entry may be parsed or searched for predetermined data patterns at S702, using one or more pattern-recognition algorithms. If a data pattern is recognized, the Monitor Tool may initiate monitoring and logging of the chat room session and its participants at S703. Thereafter, the Analysis Tool may alter the chat entry by replacing the characters of the suspect chat entry and replacing them with random or pre-selected characters, at S704. The Chat Server may then display the altered chat entry on receiving user's terminals, as shown in FIG. 6, at step S705.

In the alternative, or in addition, a chat entry may be received by the Filter Center and analyzed to detect a predetermined data pattern. If a data pattern is detected, a warning may be displayed on the chat entry senders terminal 23, 24, or 25. The warning may advise the chat entry sender that the chat entry the sender is about to send may possibly be disclosing personal identifying information and that, as a result, he or she may be subject to identity theft. The warning then provides the chat entry sender the option of sending the chat entry to the other users' terminals in the chat room session. If the chat entry sender opts to send the chat entry despite the warning, the chat entry may be displayed on the other users' terminals 23, 24 or 25. If the user opts not to send the chat entry, then the Filter Center may monitor the chat conversation and log the users' registration information. Thereafter, an announcement may be displayed on the users' terminals, which announcement may indicate that the chat entry sender opted not to provide the data that fit the predetermined data pattern, that the chat room session is being monitored for phishing activity, that the users' registration information is being logged, or any combination of the foregoing.

Figure 8:
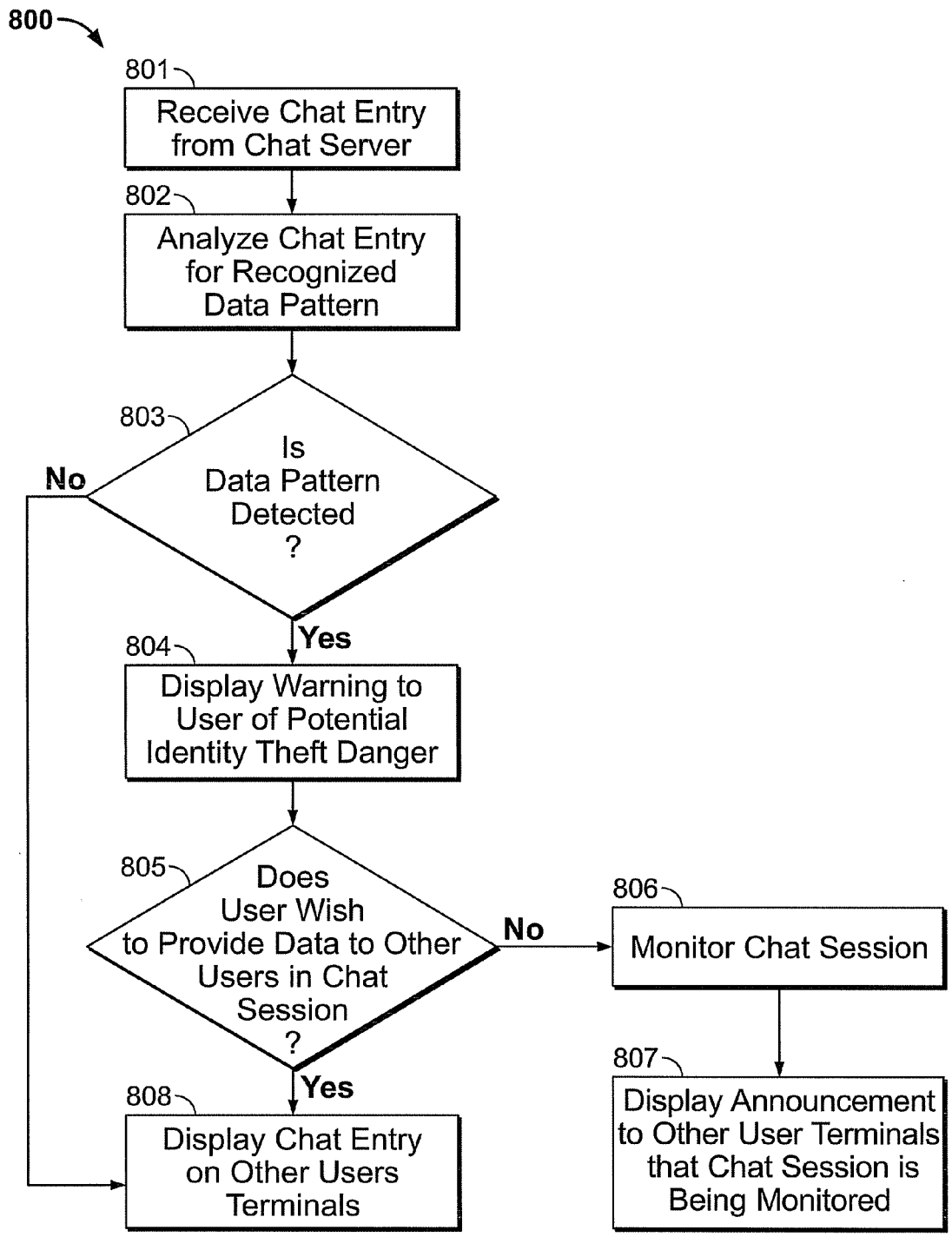
FIG. 8 is a block diagram showing exemplary steps of a method of the invention according to a third embodiment of the invention.

FIG. 8 is a flow chart showing exemplary steps of a method 800 according to the foregoing. The Filter Center may receive a chat entry from the Chat Server as shown at S801. The Filter Center may analyze the chat entry for a predetermined data pattern at S802. If a data pattern is detected, a warning may be displayed on the chat entry senders terminal S803 and S804. The warning may advise the chat entry sender that the chat entry he or she is about to send may be disclosing personal identifying information and that, as a result, he or she may be subject to identity theft. The warning may then provide the chat entry sender the option of sending the chat entry to the other users' terminals in the chat room session S805. If the chat entry sender opts to send the chat entry despite the warning, the chat entry may be displayed on the other users' terminals S808. If the user opts not to send the chat entry, then the Filter Center may monitor the chat conversation and log the users' registration information S806. Thereafter, an announcement may be displayed on the users' terminals indicating the chat entry sender opted not to provide the data that fit the predetermined data pattern, that the chat room session was being monitored for phishing activity and that the users' registration information was being logged, at S807.

Having thus described embodiments of a system and method for monitoring chat room data exchanges and preventing phishing attacks occurring within chat room data exchanges, it should be apparent to those skilled in the art that certain advantages of the within system have been achieved. It should also be appreciated that various modifications, adaptations, and alternative embodiments thereof may be made within the scope and spirit of the present invention.

What is claimed is:

1. A method, comprising:
    parsing, by a computer server operating a pattern-recognition algorithm, text chat data exchanged between a first user and a second user during an electronic chat room data exchange session hosted by the computer server;
    detecting, by the computer server operating a pattern-recognition algorithm, a defined type of personal identification number comprising at least one of a government-assigned identity number or an account number in text data received from the first user, wherein the detecting does not require recognition of any defined keyword or phrase in the chat data;
    providing, by the computer server, an option enabling the first user to send the text data comprising the personal identification number to the second user;
    if the computer server receives an indication that the option to send the text data comprising the personal identification number is selected, sending, by the computer server, the text data to the second user;
    if the computer server receives an indication that the option to send the text data comprising the personal identification number is not selected, altering, by the computer server, a user interface associated with the text chat data, in response to detecting the defined type of personal identification number, wherein the altering comprises including an announcement indicating at least one of that the first user opted not to provide the personal identification number, that the chat room data exchange session is being monitored for phishing activity, or that the users' registration information is being logged.

2. The method of claim 1, further comprising altering the text chat data including generating an altered personal identifying number at least in part by replacing at least one original character in the personal identification number with a random altered character distinct from the at least one original character, and providing the altered personal identifying number to the second user instead of the personal identification number originally received from the first user.

3. The method of claim 1, wherein the altering comprises serving a warning message to the first user in connection with the electronic chat room data exchange session warning of potential identity theft danger.

4. The method of claim 3, further comprising providing the first user with at least two options, comprising a first option for preventing transmission of the personal identification number to the second user in the chat data, or a second option for transmitting the personal identification number to the second user in the chat data.

5. The method of claim 1, further comprising archiving data exchanged in the chat room data exchange session and identifiers for the first user and second user, in response to detecting the defined type of personal identification number.

6. The method of claim 1, further comprising providing an alert signal to an administrator identifying the chat room data exchange session, in response to detecting the defined type of personal identification number.

7. The method of claim 1, wherein detecting the personal identification number comprises detecting a data pattern from the group consisting of a date, a government-assigned identity number, and an account number.

8. The method of claim 1, further comprising alerting other users engaged in the chat room data exchange of a risk of identity theft, in response to detecting the defined type of personal identification number.

9. A chat server apparatus comprising a processor coupled to a terminal and to a filter center module, the filter center module comprising instructions that when executed by the processor cause the chat server apparatus to perform:
  parsing, using a pattern-recognition algorithm, text chat data exchanged between a first user and a second user during an electronic chat room data exchange session hosted by the chat server,
  detecting, using the pattern-recognition algorithm, a defined type of personal identification number comprising at least one of a government-assigned identity number or an account number in text data received from the first user, wherein the detecting does not require recognition of any defined keyword or phrase in the chat data;
  providing, by the chat server, an option enabling the first user to send the text data comprising the personal identification number to the second user;
  if the chat server receives an indication that the option to send the text data comprising the personal identification number is selected, sending, by the chat server, the text data to the second user;
  if the chat server receives an indication that the option to send the text data comprising the personal identification number is not selected, altering a user interface associated with the text chat data, in response to detecting the defined type of personal identification number, wherein the altering comprises including an announcement indicating at least one of that the first user opted not to provide the personal identification number, that the chat room data exchange session is being monitored for phishing activity, or that the users' registration information is being logged.

10. The chat server apparatus of claim 9, wherein the filter center module comprises further instructions for generating an altered personal identifying number at least in part by replacing at least one original character in the personal identification number with a random altered character distinct from the at least one original character, and providing the altered personal identifying number to the second user instead of the personal identification number originally received from the first user.

11. The chat server apparatus of claim 9, wherein the filter center module comprises further instructions for performing the altering at least in part by serving a warning message to the first user in connection with the electronic chat room data exchange session warning of potential identity theft danger.

12. The chat server apparatus of claim 11, wherein the filter center module comprises further instructions for providing the first user with at least two options, comprising a first option for preventing transmission of the personal identification number to the second user in the chat data, or a second option for transmitting the personal identification number to the second user in the chat data.

13. The chat server apparatus of claim 9, wherein the filter center module comprises further instructions for archiving data exchanged in the chat room data exchange session and identifiers for the first user and second user, in response to detecting the defined type of personal identification number.

14. The chat server apparatus of claim 9, wherein the filter center module comprises further instructions for providing an alert signal to an administrator identifying the chat room data exchange session, in response to detecting the defined type of personal identification number.

15. The chat server apparatus of claim 9, wherein the filter center module comprises further instructions for detecting the personal identification number at least in part by detecting a data pattern from the group consisting of a date, a government-assigned identity number, and an account number.

16. The method of claim 1, further comprising alerting other users engaged in the chat room data exchange of a risk of identity theft, in response to detecting the defined type of personal identification number.

17. A non-transitory computer-readable medium, holding program instructions executable by a processor to cause a computer server to perform:
  parsing, using a pattern-recognition algorithm, text chat data exchanged between a first user and a second user during an electronic chat room data exchange session hosted by the computer server,
  detecting, using the pattern-recognition algorithm, a defined type of personal identification number comprising at least one of a government-assigned identity number or an account number in text data received from the first user, wherein the detecting does not require recognition of any defined keyword or phrase in the chat data;
  providing, by the computer server, an option enabling the first user to send the text data comprising the personal identification number to the second user;
  if the computer server receives an indication that the option to send the text data comprising the personal identification number is selected, sending, by the computer server, the text data to the second user;
  if the computer server receives an indication that the option to send the text data comprising the personal identification number is not selected, altering a user interface associated with the text chat data, in response to detecting the defined type of personal identification number, wherein the altering comprises including an announcement indicating at least one of that the first user opted not to provide the personal identification number, that the chat room data exchange session is being monitored for phishing activity, or that the users' registration information is being logged.

18. A chat server apparatus comprising:
means for parsing text chat data exchanged between a first user and a second user during an electronic chat room data exchange session hosted by the chat server,
means for detecting a defined type of personal identification number comprising at least one of a government-assigned identity number or an account number in text data received from the first user, wherein the detecting does not require recognition of any defined keyword or phrase in the chat data;
means for providing an option enabling the first user to send the text data comprising the personal identification number to the second user;
means for sending the text data to the second user if the chat server receives an indication that the option to send the text data comprising the personal identification number is selected;
means for altering a user interface associated with the text chat data, if the chat server receives an indication that the option to send the text data comprising the personal identification number is not selected, in response to detecting the defined type of personal identification number, wherein the altering comprises including an announcement indicating at least one of that the first user opted not to provide the personal identification number, that the chat room data exchange session is being monitored for phishing activity, or that the users' registration information is being logged.

* * * * *